United States Patent
Blacquiere et al.

(10) Patent No.: US 7,487,306 B2
(45) Date of Patent: Feb. 3, 2009

(54) DEVICE AND METHOD FOR RECORDING INFORMATION

(75) Inventors: Johannis Friso Rendert Blacquiere, Eindhoven (NL); Pope Ijtsma, Eindhoven (NL); Dirk Hamelinck, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 358 days.

(21) Appl. No.: 10/561,464

(22) PCT Filed: Jun. 17, 2004

(86) PCT No.: PCT/IB2004/050926

§ 371 (c)(1),
(2), (4) Date: Dec. 20, 2005

(87) PCT Pub. No.: WO2004/114298

PCT Pub. Date: Dec. 29, 2004

(65) Prior Publication Data

US 2006/0181992 A1    Aug. 17, 2006

(30) Foreign Application Priority Data

Jun. 23, 2003  (EP)  .................. 03101835

(51) Int. Cl.
G06F 12/00 (2006.01)
G06F 13/00 (2006.01)
G06F 13/28 (2006.01)
G06F 11/00 (2006.01)

(52) U.S. Cl. ......................... 711/159; 714/8

(58) Field of Classification Search ................. 711/159; 714/8
See application file for complete search history.

(56) References Cited

U.S. PATENT DOCUMENTS

| 6,314,235 | B1 * | 11/2001 | Gotoh et al. ................... 386/95 |
| 7,058,852 | B2 * | 6/2006 | Sims et al. ..................... 714/8 |
| 2001/0002488 | A1 | 5/2001 | Sims, III et al. |
| 2002/0097666 | A1 | 7/2002 | Ko et al. |
| 2002/0159382 | A1 | 10/2002 | Ohata et al. |
| 2002/0184440 | A1 | 12/2002 | Park et al. |
| 2003/0191980 | A1 * | 10/2003 | Gotoh et al. .................... 714/7 |

FOREIGN PATENT DOCUMENTS

EP    1258881 A2    11/2002

* cited by examiner

Primary Examiner—Pierre-Michel Bataille
Assistant Examiner—Edward J Dudek
(74) Attorney, Agent, or Firm—Michael E. Belk

(57) ABSTRACT

A device for recording information records blocks, having continuous logical addresses on a record carrier at corresponding physical addresses, translates logical addresses into physical addresses in dependence of defect management information. The, defect management information includes assignment information indicative of assignment of physical addresses in first parts of the track to at least one user data area, assignment of physical addresses in second parts of the track to defect management areas, and assignment of the defect management information to the defect management areas. A data type of recorded information is detected, such as the type being streaming for real-time data like digitally encoded video, or non-streaming for random data like computer data files. The device reassigns defect management area for changing the assignment information in dependence of the data type. For example, a contiguous defect management layout is converted into a distributed layout.

10 Claims, 3 Drawing Sheets

DEVICE AND METHOD FOR RECORDING INFORMATION

Figure 1A:
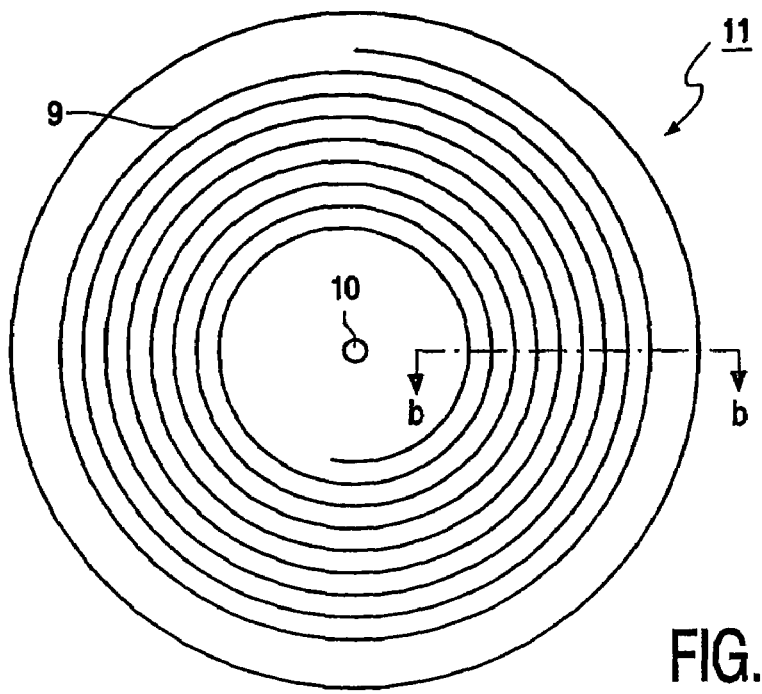

The invention relates to a device for recording information in blocks having logical addresses on a record carrier.

The invention further relates to a method of defect management for recording of information in blocks having logical addresses on a record carrier.

The invention further relates to a computer program product for defect management for recording information.

The invention relates to the field of defect management in recording systems, and in particular to defect management when recording real-time information such as video.

A device and method for recording information on a record carrier are known from US 2001/0002488. The apparatus has recording means for recording the information in information blocks having logical addresses on an optical disc in a track at allocated physical addresses. The logical addresses constitute a contiguous storage space. In practice, the record carrier may exhibit defective parts of the track, in particular a defect preventing a block to be recorded at a specific physical address. These defects might be caused by scratches, dust, fingerprints and so on. Initially, before any user data is recorded, defects are detected, and physical addresses of defective sectors are removed from use in a defect table, a process usually called slipping and creating a primary defect list. In the event of defects detected during use of the record carrier, logical addresses assigned to defective physical addresses are assigned to different physical addresses in a defect management area, a process usually called remapping or linear replacement and creating a secondary defect list. Remapping introduces a performance penalty as remapping introduces a movement of the recording head (for example an optical pickup unit, OPU), and possibly also a medium rotational speed adjustment and rotational delay(s). Hence defect management areas are located distributed over the total recording area to reduce jumping distances. The known system allows selecting the parameters of the distribution at format time of the record carrier based on an expected type of information, i.e. selecting an assignment of physical addresses to defect management areas to accommodate defect management information. For example a distribution having a large user data area followed by a large defect management spare area is suitable for large data files. A problem is that when the actual information on the record carrier is different form the expected type of information, the selected distribution is not efficient.

It is an object of the invention to provide a system for assigning physical address to defect management information in a more efficient way.

For this purpose, the device as described in the opening paragraph comprises recording means for recording marks in a track on the record carrier representing the information, and control means for controlling the recording by locating each block at a physical address in the track, the control means comprising addressing means for translating the logical addresses into the physical addresses and vice versa in dependence of defect management information, defect management means for detecting defects and maintaining the defect management information, the defect management information including assignment information indicative of assignment of physical addresses in first parts of the track to at least one user data area, assignment of physical addresses in second parts of the track to defect management areas and assignment of the defect management information to the defect management areas, and the defect management information including remapping information indicative for translating a logical address initially mapped to a physical address exhibiting a defect to an alternate physical address in a defect management area, data type detection means for detecting a data type of recorded information, in particular the type being streaming for real-time data like digitally encoded video, or non-streaming for random data like computer data files, and defect management area reassignment means for changing said assignment information in dependence of the data type.

For this purpose, the method as described in the opening paragraph is for defect management for recording of information in blocks having logical addresses on a record carrier by locating each block at a physical address in the track, translating the logical addresses into the physical addresses and vice versa in dependence of defect management information, detecting defects and maintaining the defect management information, the defect management information including assignment information indicative of assignment of physical addresses in first parts of the track to at least one user data area, assignment of physical addresses in second parts of the track to defect management areas and assignment of the defect management information to the defect management areas, and the defect management information including remapping information indicative for translating a logical address initially mapped to a physical address exhibiting a defect to an alternate physical address in a defect management area, the method comprising detecting a data type of recorded information, in particular the type being streaming for real-time data like digitally encoded video, or non-streaming for random data like computer data files, and changing said assignment information in dependence of the data type.

The measures have the effect that the layout and assigned use of defect management areas is dynamically adapted to the type of information actually recorded on the record carrier. This has the advantage that that defect management areas which would interrupt large files of recorded data, are moved to a different physical address range, whereas in the event of small files and random data access local defect management areas are provided. This has the advantage that the large files are stored more contiguously and no jumps are required to skip defect management areas, and small files have local defect management areas.

The invention is also based on the following recognition. Optical media in general have quite a reasonable data-rate, but the access performance (jumping over the disc) is rather limited. Hence for writing a file to the medium and/or reading the file as fast as possible it is preferred to write (read) the file physically contiguous to the medium. An application accessing the record carrier via a usual (host) interface can only influence logical addresses of the medium to which blocks of the file should be written. In order to get a large file as fast as possible to a medium the application may assign a large continuous logical address space. In the recording device (drive) the continuous logical address space is mapped on the physical address space of the medium. In general this mapping is rather straight forward (e.g. something like a 1-to-1 mapping), but defects and defect management areas will interrupt the allocated physical address range. Defects necessarily have to be accommodated by the defect management system. The inventors have seen that the layout and assigned use of defect management areas can be dynamically adapted for contiguous recording and/or for random access recording in dependence of the actual data type. It is to be noted that, due to changing the layout, additional measures are required if data has been already recorded on a record carrier after formatting In an embodiment of the device the defect management area reassignment means are for changing said assignment information from a distributed layout having the first parts and the second parts of the track alternatingly arranged to a contiguous layout having a substantially uninterrupted user data area in dependence of the data type being streaming, or vice versa. This has the advantage that large data files, in particular video, can be accommodated in contiguous physical address ranges, which improves the speed of retrieval.

In an embodiment of the device the defect management area reassignment means are for assigning a defect to a first defect management area for information of the streaming type, or to a second defect management area for information of the non-streaming type. The use of the defect management area is selected based on the type of data recorded. This has the advantage that non-streaming files can have small local spare defect management areas, whereas for streaming data larger sections can be accommodated in remote defect management areas. In a further embodiment of the device the defect management area reassignment means are for double assigning by remapping a same defect to both the first defect management area and the second defect management area. The same defect is now remapped to two separate locations. This has the advantage that, during readout, the most suitable location can be used for retrieving the block remapped due to the defect, e.g. selecting the first defect management area for information of the streaming type while reading large amounts of a file, and selecting the second defect management area for information of the non-streaming type while random accessing that same file.

Figure 1B:
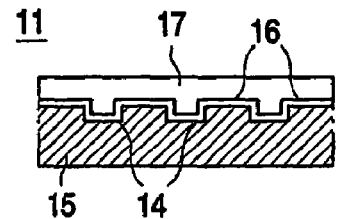
Figure 2:
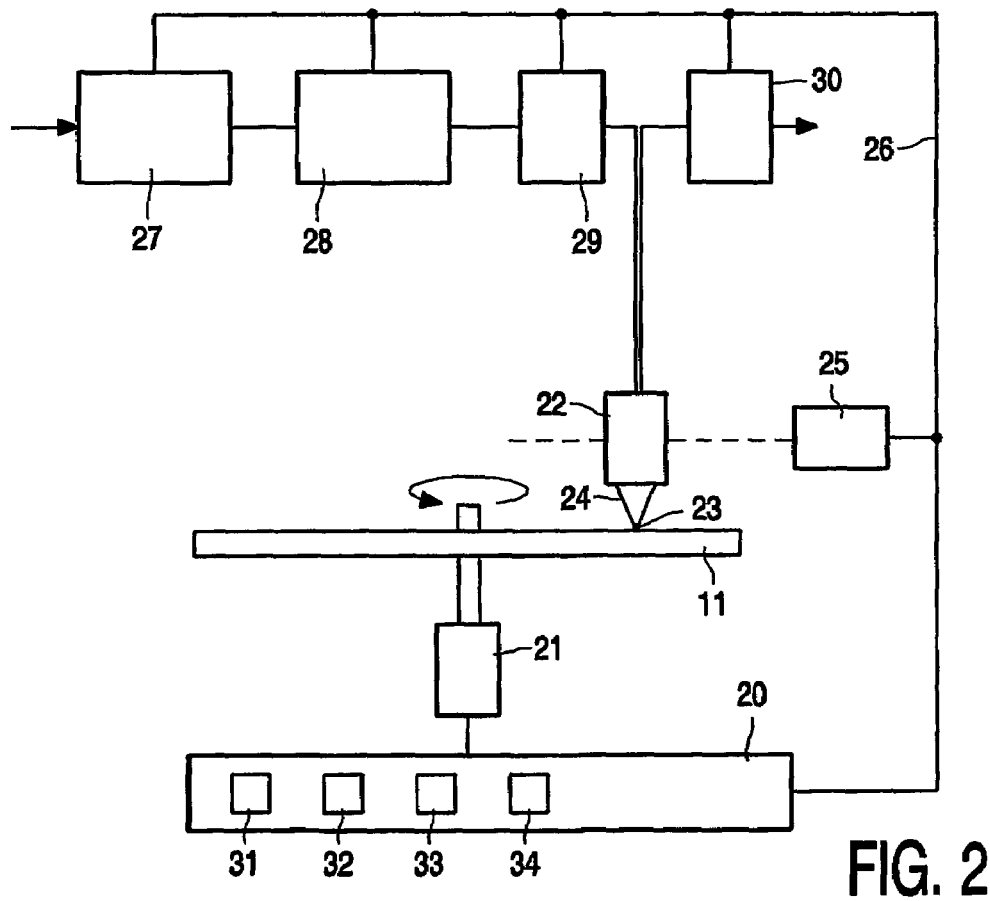
Figure 3:
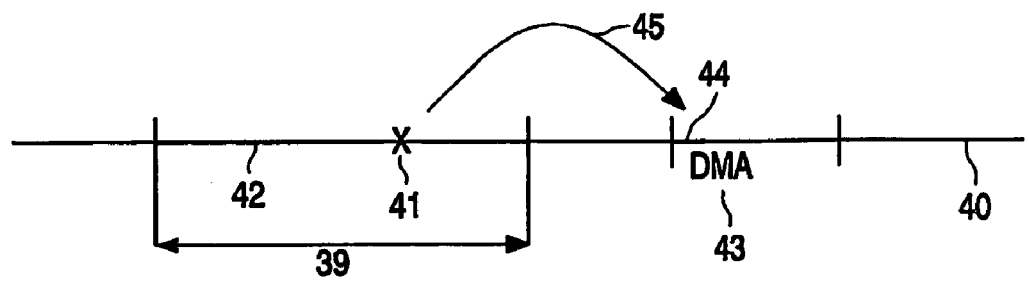
Figure 4:
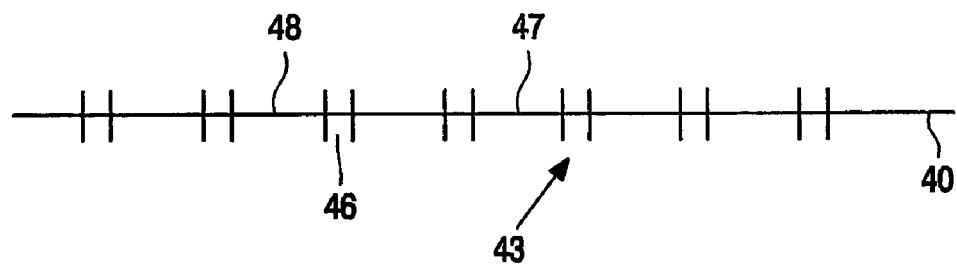
Figure 5:
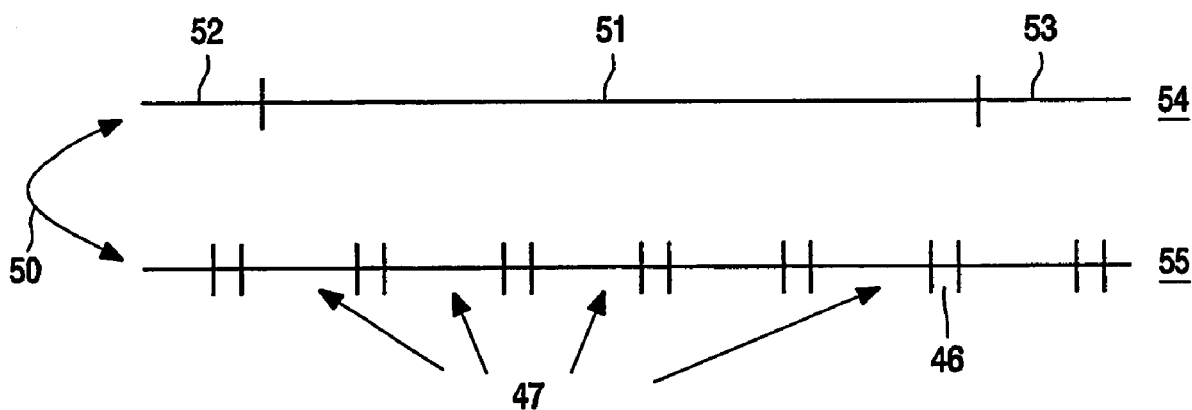
Figure 6:
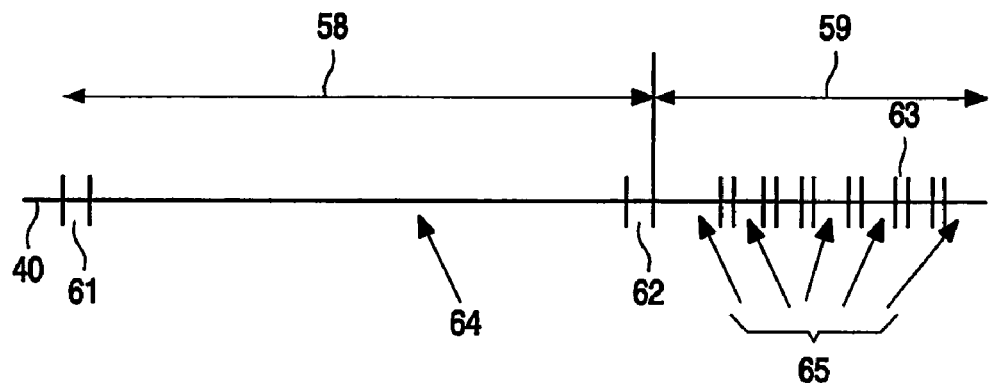
Figure 7:
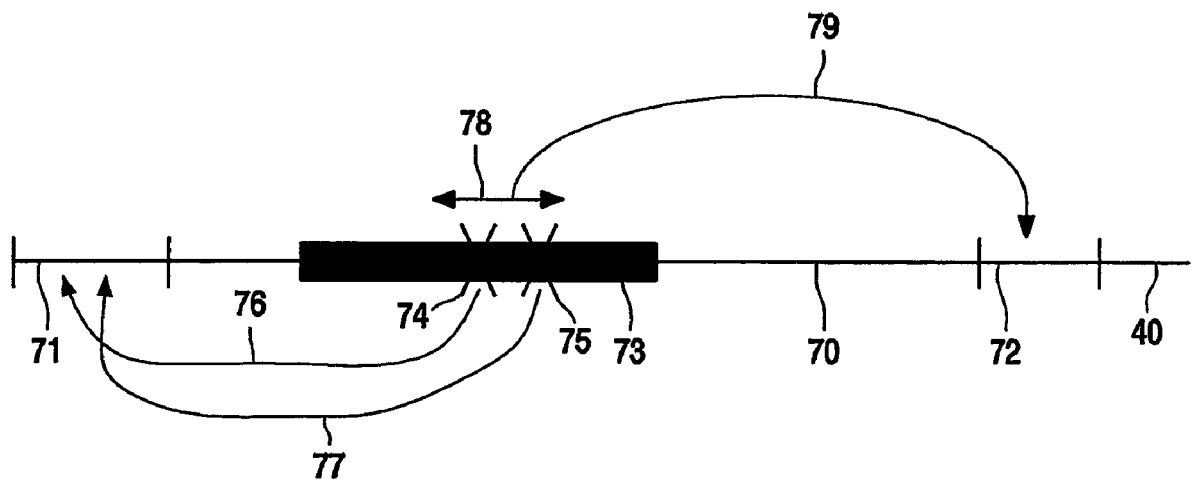

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a recording device, FIG. 3 shows remapping of defective locations, FIG. 4 shows a defect management layout having distributed defect management areas, FIG. 5 shows a transformation of a defect management layout, FIG. 6 shows a content dependent defect management layout, and FIG. 7 shows double assignment of defect management areas.

Corresponding elements in different Figures have identical reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blu-ray Disc (BD). Further details about the DVD disc can be found in reference: *ECMA*-267: 120 *mm DVD—Read-Only Disc—* (1997). The information is represented on the information layer by recording optically detectable marks along the track, e.g. crystalline or amorphous marks in phase change material. The track 9 on the recordable type of record carrier is indicated by a pre-embossed track structure provided during manufacture of the blank record carrier. The track structure is constituted, for example, by a pregroove 14 in FIG. 1b which enables a read/write head to follow the track during scanning.

The track structure comprises position information including so-called physical addresses, for indicating the location of units of information, usually called information blocks. The position information includes specific synchronizing marks for locating the start of such information blocks.

FIG. 1b is a cross-section taken along the line b-b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

The record carrier 11 is intended for carrying digital information in blocks under control of a file management system, the information including real-time information to be recorded and reproduced continuously, in particular information representing digitally encoded video according to a standardized format like MPEG2.

FIG. 2 shows a recording device for writing information on a record carrier 11 of a type which is writable or re-writable, for example CD-R or CD-RW, or DVD+RW or BD. The device is provided with recording means for scanning the track on the record carrier which means include a drive unit 21 for rotating the record carrier 11, a head 22, a positioning unit 25 for coarsely positioning the head 22 in the radial direction on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning the spot 23 in a radial direction on the center of the track. The tracking actuator may comprise coils for radially moving an optical element or may alternatively be arranged for changing the angle of a reflecting element. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material. For reading the radiation reflected by the information layer is detected by a detector of a usual type, e.g. a four-quadrant diode, in the head 22 for generating a read signal and further detector signals including a tracking error and a focusing error signal for controlling said tracking and focusing actuators. The read signal is processed by read processing unit 30 of a usual type including a demodulator, deformatter and output unit to retrieve the information. Hence retrieving means for reading information include the drive unit 21, the head 22, the positioning unit 25 and the read processing unit 30. The device comprises write processing means for processing the input information to generate a write signal to drive the head 22, which means comprise an input unit 27, and modulator means comprising a formatter 28 and a modulator 29. During the writing operation, marks representing the information are formed on the record carrier. The marks are formed by means of the spot 23 generated on the recording layer via the beam 24 of electromagnetic radiation, usually from a laser diode. Writing and reading of information for recording on optical disks and formatting, error correcting and channel coding rules are well-known in the art, e.g. from the CD and DVD system.

The control unit 20 is connected via control lines 26, e.g. a system bus, to said input unit 27, formatter 28 and modulator 29, to the read processing unit 30, and to the drive unit 21, and the positioning unit 25. The control unit 20 comprises control circuitry, for example a microprocessor, a program memory and control gates, for performing the procedures and functions according to the invention as described below. The control unit 20 may also be implemented as a state machine in logic circuits. The control unit 20 controls the recording and retrieving of information and may be arranged for receiving commands from a user or from a host computer.

The input unit 27 processes the audio and/or video to units of information, which are passed to the formatter 28 for adding control data and formatting the data as information blocks according to a predefined recording format, e.g. by adding error correction codes (ECC) and/or interleaving. For computer applications units of information may be interfaced to the formatter 28 directly. The formatted data from the output of the formatter 28 is passed to the modulation unit 29, which comprises for example a channel coder, for generating a modulated signal which drives the head 22. Further the modulation unit 29 comprises synchronizing means for including synchronizing patterns in the modulated signal. The formatted units presented to the input of the modulation unit 29 comprise address information and are written to corresponding addressable locations on the record carrier under the control of control unit 20, and for performing defect management as described below.

In an embodiment the input unit 27 is arranged for receiving real-time information. The input unit may comprise compression means for input signals such as analog audio and/or video, or digital uncompressed audio/video. Suitable compression means are described for audio in WO 98/16014-A1 (PHN 16452), and for video in the MPEG2 standard. The input signal may alternatively be already digitally encoded.

The control unit 20 is arranged for controlling the recording by locating each block at a physical address in the track, and includes the following cooperating units: an addressing unit 31, a defect management unit 32, a data type detection unit 33, and defect management area reassignment unit 34.

The addressing unit 31 is for translating physical addresses into logical addresses and vice versa in dependence of defect management information. The logical addresses constitute a contiguous storage space to be used for storing files of information blocks under control of a file management system, for example UDF. The defect management unit 32 detects defects, for example by monitoring the signal quality of a readout signal from the head 22 during recording and/or reading. The defects may also be detected by determining an error rate in retrieved information blocks. The defect management unit further maintains the defect management information in defect management areas on the record carrier, for example in defect lists as defined for the DVD recordable systems like DVD+RW. The defect management information at least includes remapping information.

In an embodiment the recording device is arranged as a drive unit to be connected to a separate host system, for example a drive unit to be build in a PC. The control unit 20 is arranged to communicate with a processing unit in the host system via a standardized interface. Alternatively the recording drive is arranged as a stand alone unit, for example a video recording apparatus for consumer use. The control unit 20, or an additional host control unit included in the device, is arranged to be controlled directly by the user, and to also perform the functions of the file management system.

The data type detection unit 33 in FIG. 2 performs the following functions. A data type of recorded information is detected, in particular the type being streaming for real-time data like digitally encoded video, or non-streaming for random data like computer data files. The random access or streaming type of data can be detected in various ways, such as detecting the data type by monitoring commands for recording or retrieving information, retrieving record carrier information indicative of the data type, detecting a data type from the data structure of the recorded information. For example it is detected that a series of blocks having a continuous logical address range is to be recorded in a corresponding allocated physical address range. In general contiguous recording is required for real-time information which has a relative high data rate, in particular video information. The type of data may be included in the writing commands received by the control unit, for example a write command from a host computer including a real-time bit. The detection of contiguous recording may also be based on the amount of data blocks indicated in a write command, or by other aspects such as the fact that new blocks having logical addresses consecutive to the last written block arrive at regular intervals.

Typical drives don't have knowledge about files, e.g. start- and endpoints. A drive not having file-system knowledge can detect streaming write and retrieval behaviour as consequence of host activity based on read/write command information (streaming read and write commands) or when streaming indicators are stored on the disc, for example a "contiguous" bit included in a file entry (according to UDF in the file identifier descriptor) or a streaming bit included in a sector header, in zone-descriptors, or a streaming-location bitmap of the disc. Furthermore the use of the information in previous read or write sessions may be detected and stored for later use, e.g. by saving the nature of last activity (streaming/non-streaming) by the host on a specific location.

In an embodiment the device is provided with file-system knowledge and/or knowledge about the content recorded. Hence the data type can be retrieved directly from that knowledge. Alternatively file-system and content knowledge can be requested from the host system by interaction via the command interface with the drive.

The defect management areas are located on the record carrier according to a layout. In the layout physical address are assigned a specific logical address or defect management function. Thereto the defect management information includes assignment information indicative of assignment of physical addresses in first parts of the track to at least one user data area, assignment of physical addresses in second parts of the track to defect management areas and assignment of the defect management information to the defect management areas. The assignment of the defect management information to the defect management areas indicates the use of the defect management area, for example a primary defect list and a secondary defect list, or replacement area for a specific type of defects.

The defect management area reassignment means 34 are for changing said assignment information in dependence of the data type as described below in detail.

FIG. 3 shows remapping of defective locations. A physical address space 40 is schematically represented by a horizontal line. A series of blocks 42 is to be recorded in an allocated physical address range 39. However a defect 41 interrupts the allocated physical address range. Remapping 45 is the process that a block 44 having a logical address corresponding to the physical address 41 that is defective is stored in an alternative physical address in a defect management spare area (DMA) 43. The remapping information provides data for translating the logical address initially mapped to a physical address exhibiting a defect to an alternate physical address in a defect management area, for example an entry in a secondary defect list including the logical address of the remapped block and its corresponding physical address. Alternatively remapping information may include data for translation of a physical address of a defect to a different physical address in a defect management area.

FIG. 4 shows a defect management layout having distributed defect management areas. A physical address space 40 is schematically represented by a horizontal line. First parts of the physical address space are assigned to defect management areas (DMA) 43,46 and second parts of the physical address space are assigned to user data areas 47,48, i.e. are assigned to logical addresses available for storing user data. An example is the Mount Rainier defect management as defined for CD-MRW. A description of Mount Rainier and CD-MRW is available from Philips on http://www.licensing.philips.com/information/mtr/. In the logical space of the medium the DMAs are not visible. This means that if a large file is written to disc even if the entire file has continuous logical addresses, there will be DMAs included in the physical address allocated to the file. These DMAs in the middle of such a data file harm the performance of writing and consequent reading back of the file, as there are a number of jumps introduced when the entire file is written (retrieved) due to the jumping over the DMAs. The solution is to adapt the defect management area layout to the data type recorded in the respective area As a result the large files are contiguous not only logically, but also physically on the medium. When the record carrier contains non-streaming data that is randomly accessed, local defect management areas are available for remapping.

FIG. 5 shows a transformation of a defect management layout. The lower part of the Figure corresponds to FIG. 4 having a distributed layout 55 of the defect management areas 46 and non contiguous user data areas 47. An arrow 50 indicates a transformation to a contiguous layout 54 in the upper part of the Figure, or vice versa. The contiguous layout 54 has a single contiguous user data area 51, and two defect management areas 52,53 at the start and at the end of the recordable range of physical addresses. The difference of both layouts is as follows. The first layout 55 as used for CD-MRW (Mt Rainier) has a larger number of Defect Management Areas (DMAs) equally divided over the disc space. The contiguous layout 55 has only two larger DMAs, one located at the start of the disc (inner side) and one at the end of the disc (outer side). This layout is used for DVD+MRW. Each of the layouts has its advantages and disadvantages. In the distributed layout 55 a DMA is always close (physically) to the defect Hence small jumps to DMA are required. However logical data area can't be mapped contiguously on the physical area, due to the DMAs. This means that large files that are written contiguously on the logical level do require jumping over the DMAs on the physical level. In the contiguous layout 54 there is a large physical contiguous area on disc. Hence logical contiguous blocks are stored physical contiguous. Two large defect management areas allow for a more flexible defect reallocation strategy. For example a large defect can be remapped to one DMA instead of being remapped to various smaller DMAs. From a physical area point of view this layout is similar to a ROM format. However, on average longer jumps towards a DMA are required, which consumes time. In general the distributed layout is favourable for (a lot of) smaller data files. These smaller files can easily be allocated around the DMAs, so these files can be allocated physically contiguous. The contiguous layout is designed for larger files. These files can be written physically contiguously on disc, without any DMAs in between. Conventionally the layout of the DMAs is determined during the formatting process of the medium. The solution as described hereunder is the technique to change the layout of the DMAs on disc during the normal use of the medium. The start and end result of such a 'transformation' is shown in FIG. 5.

If there is no previously recorded data present in the user data area the transition from layout 54 towards layout 55 and vice versa requires only changing the DMA setting that indicates the location and sizes of the DMAs. This information, which includes pointers to the sparing locations, is typically located in defect-table-information (for example located in reserved defect management areas outside the user data area, or in the lead-in). However, where there is previously recorded user data present on the disc, to go from one DMA layout to another DMA layout, any remapped data in the DMA zones has to be moved to the new DMA zones, and user data present at the planned new locations of the DMAs has to be moved to free space in the new layout. The device should also take care that the logical address location of all user data remains the same. For example previously recorded data blocks are moved to a new physical address that, according to the new layout, corresponds to the logical address. Alternatively a list of offsets to be applied for ranges of physical addresses can be generated and stored.

In an embodiment shifting of data across the disc as result of above layout change is replaced by altering the file allocation in the file system to fit the new disc layout. This requires file system knowledge inside the drive or negotiation and communication between the drive and the file system, such to update the file system information accordingly. Once a drive has adequate file system knowledge, this could be used for taking optimal choices in moving the remapped data from the DMAs in one situation to the DMAs in the other situation. Jumping distances can be minimized by taking the locations of the user data and remapped data into consideration. The new location of data and defect management used can be adapted to the specific content on the disc.

FIG. 6 shows a content dependent defect management layout. A physical address space 40 is schematically represented by a horizontal line. The defect management area reassignment means 34 are for adapting the defect management as shown. In a first physical address range 58 the contiguous layout is used, which first physical address range contains streaming type information 64, e.g. a large video file. Relative large defect management spare areas 61,62 are located at the beginning and end of the first physical address range 58. In a second physical address range 59 the distributed layout is used, which second physical address range contains non-streaming information, such as computer files 65. Relatively small defect management spare areas 63 are located distributed over the second physical address range 59 The defect management layout on the disc is adapted to optimally fit the content that is present on the disc. By using the techniques as described above DMAs can be relocated. The layout shown in FIG. 6 is suitable for a disc having a DVD video compliant part and a PC part with a lot of small files. Obviously other configurations of physical address ranges having a distributed layout, a contiguous layout, or other types of layout, are possible, for example several alternating ranges having different layouts.

FIG. 7 shows double assignment of defect management areas. A physical address space 40 is schematically represented by a horizontal line. A data file 73 is stored in user data area 70. In the physical address range allocated to the data file two defects 74,75 are detected. A first detect management spare area 71 is located at the beginning of the physical address space 40, which defect management area is assigned for storing errors by individually remapping defects, as shown by arrows 76,77 for the detected defects 74,75. Alternatively the detected defects 74,75 are remapped as indicated by arrow 79 in a second defect management area 72 located at the end of the physical address space 40, which defect management area is assigned for storing defects in streaming data. In an embodiment defects that are physically close are combined to constitute a single remapped section. For example, a number of blocks 78 that includes the defects 74, 75 and a few intermediate blocks is remapped as a single defect for streaming use in the second defect management area 72, while they are remapped individually for non-streaming use in the first spare area 71. For example a defect on a disc reoccurring in 100 rotations causes one block out of five needing to be spared. Remapping is suitable for non-streaming use (thus creating a linear spare every 5 blocks), but may cause a performance degradation for streaming use. Hence a solution is to spare every block for the next 100 tracks (thus needing 500 spares in contrast to 100 spares)

In an embodiment the defects are both remapped to the first defect management area 71 assigned for non-streaming defects and to the second defect management area 72 assigned for streaming defects. It is noted that the embodiments described above with FIGS. 5 and 6 are focused on optimal read/write performance for the case the content is either of a streaming type or of a non-streaming type. However, the type may also depend on the purpose of the host system with such data. For example, the host might use streaming content in a non-streaming way like collecting parts and pieces of streamed data together with non-streaming data, or a presentation with streaming content and data-content merged in one file. Also non streaming content may be accessed in a streaming fashion (like taking a disc-image of a section of a disc). The double assignment of defect management areas is suitable for both uses, although some additional space for defect management area is required. Resultantly, one logical location may have one, two or even more spare locations, and the indicator of the spare location in the defect table may be used during the read or write process to optimize the actual performance during read/write, dependent on the actual read/write requests as performed by the host. As an example using two types of spare locations (streaming and non-streaming) the implementation involves the following steps 1. assign DMA's and spare locations for defect mgt of "streaming data" and "non streaming data" across the disc
2. for "non-steaming writes" use defect spare locations of "non-streaming part of the DMA" and for "streaming writes" use the streaming part of the DMA space
3. during the idle periods, in the background, make sure each "non streaming spare" is matched by a equivalent "streaming spare" and each "streaming spare" is matched by a "non streaming spare"
4. during "non streaming read" use the "non streaming spares" from the spare location optimized for non-streaming use and during "streaming read" use the "streaming spares" from the spare location optimized for streaming-use The above assumes equal number of spares are reserved for streaming and non-streaming spares. However it may also be advantageous to reserve more spares for streaming use than for non-streaming use, or vice versa.

In an embodiment the defect management area reassignment unit 34 is arranged for detecting an unbalance between "spare locations for non streaming use" and "spare locations for streaming use". The unbalance may occur depending on the nature and position on the disc of the actual defect, the DMA and spare allocation strategies, and the content related host performance expectation when reading or writing content from the disc. The defect management area reassignment unit 34 then reassigns the defect management type for a range of physical address to compensate for the unbalance. For example DMA allocations are reassigned between "DMA space reserved for non streaming use" and "reserved DMA space for streaming use". Also mechanism to dynamically add DMA space to one of both DMA purposes at the cost of USER space may be applied. Obviously, the above examples using two types of content ("streaming" and "non-streaming") can be extended to more complex models with more content types of different nature (for example "multi-stream read-write").

It is noted that the function of the data type detection means 33 and the defect management area reassignment unit 34 can be performed as a separate defect management process for controlling the recording of information, for example in a computer program in a host computer controlling a disc drive. The drive accommodates the recording of information in blocks having logical addresses on the record carrier by locating each block at a physical address in the track, translating the logical addresses into the physical addresses and vice versa in dependence of defect management information, and detecting defects and maintaining the defect management information as described above. The defect management process comprises detecting a data type of recorded information, in particular the type being streaming for real-time data like digitally encoded video, or non-streaming for random data like computer data files, and changing said assignment information in dependence of the data type.

Although the invention has been explained mainly by embodiments using a CD-RW or DVD+RW defect management system, similar defect management systems used for other types of DVD and BD are suitable for applying the invention. Also for the information carrier an optical disc has been described, but other media, such as a magnetic hard disc, can be used. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' may be represented by the same item of hardware. Further, the scope of the invention is not limited to the embodiments, and the invention lies in each and every novel feature or combination of features described above.

The invention claimed is:

1. A device for recording information in blocks having logical addresses on a record carrier, the device comprising:
  recording means for recording marks in a track on the record carrier representing the information, and
  control means for controlling the recording by locating each block at a physical address in the track, the control means comprising:
  addressing means for translating the logical addresses into the physical addresses and vice versa in dependence of defect management information,
  defect management means for detecting defects and maintaining the defect management information, the defect management information including assignment information indicative of assignment of physical addresses in first parts of the track to at least one user data area, assignment of physical addresses in second parts of the track to defect management areas and assignment of the defect management information to the defect management areas, and the defect management information including remapping information indicative for translating a logical address initially mapped to a physical address exhibiting a defect to an alternate physical address in a defect management area, data type detection means for detecting a data type of recorded information including a streaming type for real-time data, or non-streaming type for random data, and defect management area reassignment means for changing said assignment information in dependence of the data type recorded on the record carrier including assigning a defect to a first defect management area for information of the streaming type, or to a second defect management area for information of the non-streaming type, and double assigning by remapping a same defect to both the first defect management area and the second defect management area.

2. The device as claimed in claim 1, wherein the defect management area reassignment means are for changing said assignment information from a distributed layout having the first parts and the second parts of the track alternatingly arranged to a contiguous layout having a substantially uninterrupted user data area in dependence of the data type being streaming, or vice versa.

3. Device as claimed in claim 2, wherein the defect management area reassignment means are for changing said assignment information for a first physical address range to the distributed layout and for a second physical address range to the contiguous layout, the first physical address range containing information of the non-streaming type and the second physical address range containing information of the streaming type.

4. The device as claimed in claim 1, wherein the defect management area reassignment means are for performing the double assigning as a background process.

5. The device as claimed in claim 1, wherein the defect management area reassignment means are changing the assigning of physical address to the first defect management area for information of the streaming type, or to the second defect management area for information of the non-streaming type in dependence of information recorded or defects detected on the record carrier.

6. The device as claimed in claim 1, wherein the defect management area reassignment means are for, in the event that the translation of logical address to physical address of previously recorded blocks is affected by said reassignment, moving the previously recorded blocks to a different physical address that after the reassignment corresponds to the logical address, and/or by adapting file management information by amending the logical addresses of the affected of previously recoded blocks.

7. The device as claimed in claim 1, wherein the data type detection means are for detecting the data type by monitoring commands for recording or retrieving information, by retrieving record carrier information indicative of the data type, by detecting a data type from the data structure of the recorded information, or by detecting file system information, or by communicating with a host device.

8. A method of defect management for recording of information in blocks having logical addresses on a record carrier, the method comprising the acts of:

locating each block at a physical address in the track, translating the logical addresses into the physical addresses and vice versa in dependence of defect management information, detecting defects and maintaining the defect management information, the defect management information including assignment information indicative of assignment of physical addresses in first parts of the track to at least one user data area, assignment of physical addresses in second parts of the track to defect management areas and assignment of the defect management information to the defect management areas, and the defect management information including remapping information indicative for translating a logical address initially mapped to a physical address exhibiting a defect to an alternate physical address in a defect management area, detecting a data type of recorded information, including a streaming type for real-time data, or non-streaming type for random data, and changing said assignment information in dependence of the data type recorded on the record carrier, wherein the changing act includes double assigning a same defect to a first defect management area for information of the streaming type, and to a second defect management area fro information of the non-streaming type, by remapping the same defect to both the first defect management area and the second defect management area.

9. A computer readable medium embodying a computer program, the computer program when executed by a processor is configured to cause the processor to perform the acts of:

locating each block at a physical address in the track, translating the logical addresses into the physical addresses and vice versa in dependence of defect management information, detecting defects and maintaining the defect management information, the defect management information including assignment information indicative of assignment of physical addresses in first parts of the track to at least one user data area, assignment of physical addresses in second parts of the track to defect management areas and assignment of the defect management information to the defect management areas, and the defect management information including remapping information indicative for translating a logical address initially mapped to a physical address exhibiting a defect to an alternate physical address in a defect management area, detecting a data type of recorded information, including a streaming type for real-time data, or non-streaming type for random data, and changing said assignment information in dependence of the data type recorded on the record carrier, wherein the changing act includes double assigning a same defect to a first detect management area for information of the streaming type, and to a second defect management area for information of the non-streaming type, by remapping the same defect to both the first defect management area and the second defect management area.

10. The method of claim 8, wherein the double assigning is performed as a background process.

* * * * *